United States Patent [19]

Hertzog

[11] 4,232,220
[45] Nov. 4, 1980

[54] BACKGROUND SUBTRACTION SYSTEM FOR PULSED NEUTRON LOGGING OF EARTH BOREHOLES

[75] Inventor: Russel C. Hertzog, Ridgefield, Conn.

[73] Assignee: Schlumberger Technology Corporation, New York, N.Y.

[21] Appl. No.: 36,201

[22] Filed: May 4, 1979

[51] Int. Cl.² ............................................. G01V 5/00
[52] U.S. Cl. .................................................. 250/270
[58] Field of Search ............................... 250/269, 270

[56] References Cited

U.S. PATENT DOCUMENTS

| | | | |
|---|---|---|---|
| 3,521,064 | 7/1970 | Moran et al. | 250/269 |
| 3,780,303 | 12/1973 | Smith, Jr. et al. | 250/270 |
| 3,842,265 | 10/1974 | Pitts, Jr. | 250/270 |
| 3,886,355 | 5/1975 | Culver | 250/270 |
| 3,943,362 | 3/1976 | Peelman | 250/270 |
| 4,020,342 | 4/1977 | Smith, Jr. et al. | 250/270 |

*Primary Examiner*—Davis L. Willis
*Attorney, Agent, or Firm*—Kenneth Olsen; Stephen L. Borst; Henry N. Garrana

[57] ABSTRACT

The composition of an earth formation is investigated by repetitively irradiating the formation with bursts of fast neutrons and generating an inelastic energy spectrum from gamma ray counts detected during first time intervals which are contemporaneous with the bursts. A second energy spectrum is generated from gamma ray counts detected during second time intervals which immediately follow respective first time intervals. Gamma ray counts comprising the second spectrum are thereafter subtracted from the gamma ray counts comprising the inelastic spectrum to provide an inelastic energy spectrum with reduced background.

15 Claims, 2 Drawing Figures

BACKGROUND SUBTRACTION SYSTEM FOR PULSED NEUTRON LOGGING OF EARTH BOREHOLES

BACKGROUND OF THE INVENTION

1. Field of Invention

The present invention relates in general to nuclear well logging, and pertains in particular to improved methods and apparatus for analyzing inelastic scattering gamma ray energy spectra to provide more accurate information of the composition of earth formations surrounding a well borehole.

2. The Prior Art

Heretofore, various techniques have been utilized to process gamma ray energy spectra for borehole constituent analysis. In the case of inelastic scattering gamma ray energy spectra, it is known that analysis of the spectra to identify the contributions thereto due to carbon and oxygen provides useful information of the presence of oil in a formation. Additional information concerning the composition of the formation, such as its lithology for instance, is however frequently required before an unambiguous determination of the presence of oil can be made. A suitable lithology indicator for this purpose might comprise the ratio of inelastic scattering gamma ray contributions for calcium and silicon.

The derivation of the foregoing information concerning carbon oxygen, calcium and silicon, and possibly other constituents of the formation and well bore, depends upon accurate constituent analysis of the formation gamma ray spectra. An important and basic technique for performing such analysis is disclosed in U.S. Pat. No. 3,521,064, issued on July 21, 1970 to Moran, et al. In accordance with the Moran et al. teaching, a detected gamma ray energy spectrum for a formation of unknown composition is compared with a composite spectrum made up of weighted standard spectra of the constituents postulated to comprise the formation. The weight coefficients for the standard spectra which give the best fit of the composite spectrum to the unknown spectrum, as determined, for example, by the method of least squares, represent the relative proportions of the constituents in the formation. By appropriate selection of the standard spectra, the proportions of the constituents of interest, such as carbon, oxygen, calcium, silicon, etc., may be obtained, from which the desired information regarding oil content may be derived.

Although the Moran et al. technique, as disclosed in U.S. Pat. No. 3,521,064, is applicable for the purpose of the present invention and in this respect provides substantial advantages relative to other prior art techniques, the present invention is concerned with methods and apparatus which provide still better results, particularly in connection with the analysis of inelastic scattering gamma ray spectra.

To obtain statistically accurate inelastic scattering gamma ray spectra it is desirable to irradiate the formation with neutrons at as high a repetition rate as is practicable. Closely spaced neutron bursts have the disadvantage that background gamma rays, resulting in this instance predominantly from thermal neutron capture reactions between formation constituents and neutrons from one or more preceding bursts, will be present during the detection periods for the inelastic scattering gamma rays. Such capture gamma rays will of course be sensed by the detector and, unless compensated for, will tend to degrade the inelastic scattering gamma ray spectra.

Moran et al, suggest in U.S. Pat. No. 3,521,064 that the capture gamma ray component in the detected inelastic scattering gamma ray spectrum may be accounted for by previously generating a separate "background" spectrum representative of residual capture gamma radiation from prior bursts and including such spectrum as a standard in the composite spectrum. According to the Moran et al. patent, the standard background spectrum is taken beforehand in a reference borehole or test pit. This, however, does not necessarily reflect the real in situ capture gamma ray spectrum, which varies with change in neutron source strength, sonde environment, sonde performance, etc., and thus may lead to inaccuracies in the constituent proportions obtained from the spectrum matching process.

As evidenced by U.S. Pat. No. 3,780,303 to Smith et al., it has also been proposed in the prior art to detect the level of background gamma radiation immediately before each neutron burst, and then subtract that level from the inelastic scattering gamma ray counts obtained during the burst. Since the gamma rays observed during the background detection period result predominately from thermal neutron capture, the assumption is that the inelastic scattering gamma ray spectrum will be corrected in a proper way for the presence of capture gamma rays lingering from prior bursts.

It has further been proposed in U.S. Application Ser. No. 869,584, filed Jan. 16, 1978, now abandoned, and continued as Ser. No. 040,320, filed May 19, 1979, for R. C. Hertzog et al, and assigned to the assignee of the present application the disclosure of which is hereby incorporated by reference, that a background energy spectrum be generated from gamma rays detected during periods between neutron bursts and be utilized to provide one or more standard background spectra for use in the analysis of the inelastic scattering gamma ray spectra in accordance with the aforementioned Moran, et al. practices. The standard background spectrum is then updated on a repetitive basis to reflect the current background component in the detected inelastic scattering gamma ray spectrum. The inelastic scattering gamma ray spectrum is thereafter analyzed by comparing it with a composite spectrum, made up of standard spectra of constituents, including the background spectrum, postulated to comprise the formation, to determine the proportions in the formation of the postulated constituents.

SUMMARY OF THE INVENTION

In accordance with principles of the present invention, the effect of background radiation, within a borehole under investigation, on the inelastic gamma ray measurements is accounted for in a manner which is substantially independent of the thermal neutron capture time constant of the formation under investigation and which takes into consideration variations in the thermal neutron capture background spectrum due to changes in environmental parameters in the borehole.

In further accordance with principles of the present invention, the accuracy of the inelastic gamma ray measurements, which are dependent on effective background radiation compensation, is enhanced by generating a background spectrum which is substantially related to the inelastic scattering gamma ray spectrum to be measured.

Yet in further accordance with principles of the present invention, advantage is taken of gamma ray measurements in a second or "background" time interval which immediately follows the time interval in which inelastic interactions are measured. Measurements during this background interval accurately reflect the thermal background population resulting from lingering thermal neutrons generated during previous high energy neutron bursts and from thermal capture neutrons which are generated during the most recent neutron pulse, and therefore may be considered as representative of the borehole environment in the vicinity of the detector which most affects the inelastic measurement. Through a subtractive step the background information is removed from the measurement obtained during the inelastic gate time intervals which are respectively set to encompass the neutron burst, thereby enhancing the inelastic gamma ray measurements derived.

DETAILED DESCRIPTION

Figure 1:
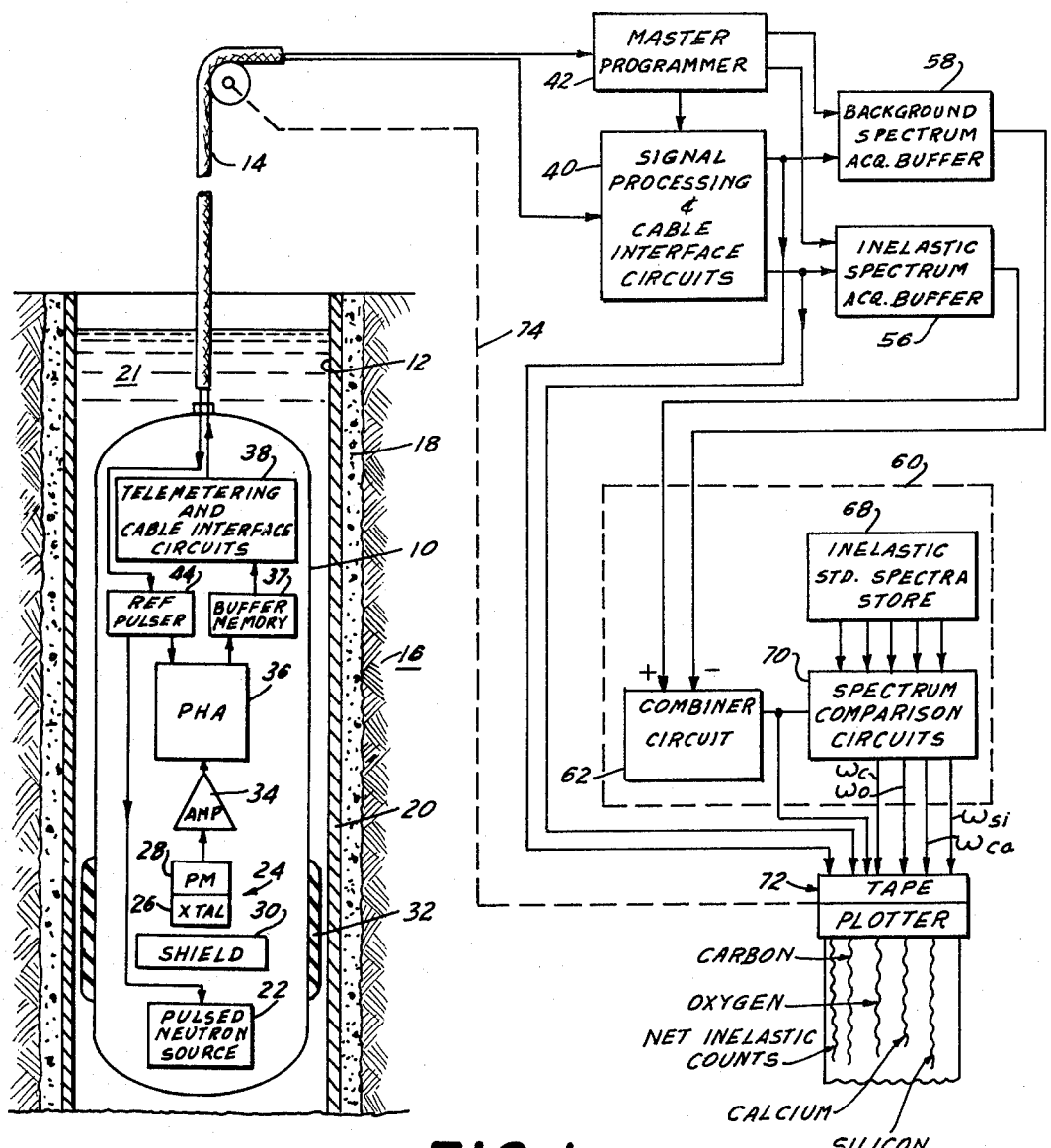
FIG. 1 is a schematic view of an embodiment of logging apparatus constructed in accordance with the invention.

Referring now to FIG. 1, a representative embodiment of the invention includes a fluid tight, pressure and temperature resistant well tool or sonde 10 that is adapted to be suspended in a well bore 12 by an armored cable 14 for investigating a subsurface earth formation 16. The well bore 12 is illustrated as cased, including the usual annulus of cement 18 and steel casing 20, and as containing a well fluid 21. Although no tubing is shown in the well bore, the tool if desired may be sized for through-tubing use. It will be understood that the invention has application also to open hole logging.

The sonde 10 includes a pulsed neutron source 22 and a radiation detector 24. The neutron source 22 preferably is of the accelerator type described in U.S. Pats. Nos. 3,461,291 to C. Goodman and 3,546,512 to A. H. Frentrop, both of which are commonly owned with this application. This type of neutron source is particularly adapted to generate discrete bursts of high energy or fast neutrons, e.g., at 14 MeV, of controlled duration and repetition rate.

The detector 24 may be of any construction appropriate to the detection of gamma rays and to the production of a pulse signal in response to each detected gamma ray having an amplitude representative of the energy of the detected gamma ray. Generally, such a detector includes a scintillation crystal 26 which is optically coupled to a photomultiplier tube 28. The crystal is preferably of the thallium-activated sodium-activated cesium iodide, may be used. Alternatively, a solid state detector, having for example a germanium crystal, might be employed. A neutron shield 30 may be positioned between the source 22 and the detector 24 to reduce bombardment of the detector by neutrons emanating directly from the source.

Electrical power for the sonde 10 is supplied through the cable 14 from a source of power (not shown) at the surface. Suitable power sources (not shown) are also included in the sonde 10 for the purpose of driving the neutron source 22, the detector 24 and other downhole electronics. The sonde 10 may be surrounded by a boron carbide impregnated sleeve 32 located generally in the region of the source 22 and detector 24. The sleeve 32 acts as a shield to minimize the detection of gamma radiation originating from neutron interactions in the immediate vicinity of the source and detector.

An amplifier 34 acts on the output pulses from the photomultiplier 28. The amplified photomultiplier pulses are thereafter applied to a pulse height analyzer (PHA) 36, which may be of any conventional type such as a single ramp (Wilkinson rundown) type. It will be understood to include the usual pulse height discriminators, for selection of the gamma ray energy range to be analyzed, and linear gating circuits, for control of the time portion of the detector sginal train to be analyzed.

PHA 36 segregates the detector pulses into predetermined channels according to their amplitude and supplies signals in suitable digital form representing the amplitude of each analyzed pulse. The digital outputs of PHA 36 are stored in a buffer memory 37 and then transferred to telemetering and cable interface circuits 38 for transmission over cable 14 to the surface. At the surface, the cable signals are received by signal processing and cable interface circuits 40. It will be understood that the circuits 38 and 40 may be of any suitable known construction for encoding and decoding, multiplexing and demultiplexing, amplifying and otherwise processing the signals for transmission to and reception by the uphole electronics. Appropriate circuits are described, for example, in U.S. Pat. No. 4,012,712, issued Mar. 15, 1977 to William B. Nelligan for "System for Telemetering Well Logging Data".

The operation of the sonde 10 is controlled by signals sent downhole from a master programmed 42 located at the surface. These signals are received by a reference pulser 44 which, in response thereto, transmits control signals to the neutron source 22 and to the PHA 36.

Upon receipt of the reference pulses, the pulsing circuit generates a sharp fire pulse thereby causing the source 22 to emit a corresponding sharp burst of fast neutrons. For purposes of constituent analysis of inelastic scattering gamma ray spectra in accordance with the invention, the neutron bursts are preferably of short duration. e.g. 18 sec, and are repeated at short intervals, e.g. every 100 sec, so as to provide satisfactory statistics in the spectrum analysis procedure.

Figure 2:
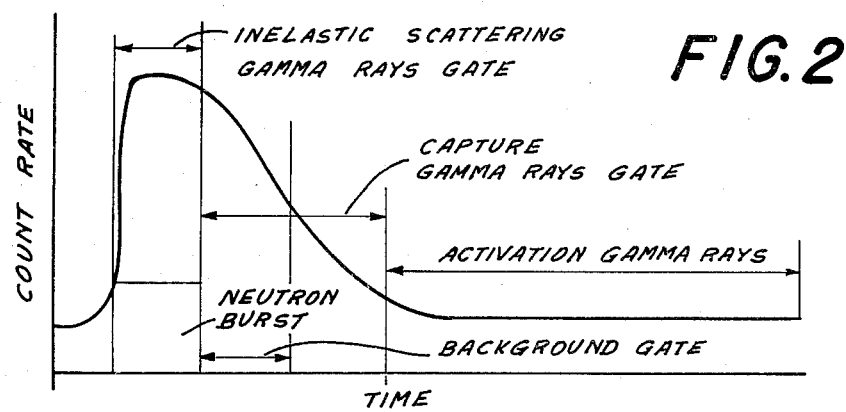
FIG. 2 is a diagrammatic representation of the time distribution of gamma rays resulting from the irradiation of an earth formation with time-spaced bursts of fast neutrons.

The control signals transmitted from the reference pulser 44 to the PHA 36 enable the linear gating circuits of the PHA during at least two different but substantially equal time intervals in relation to each neutron burst, a first interval, an inelastic scattering gamma rays gate indicated in FIG. 2, substantially coincident with the respective neutron bursts and the second interval, a background gate also indicated in FIG. 2, immediately following the neutron burst.

As may be seen from FIG. 2, the detector pulses applied to the PHA 36 during the inelastic gate correspond predominately to inelastic scattering gamma rays and the detector pulses applied to the PHA during the background gate correspond predominately to gamma rays resulting from neutron interactions other than inelastic scattering interactions. For the high burst-rate timing sequence illustrated the detector pulses generated during the background gate will include components due to gamma rays produced by (1) thermal neutron capture of neutrons from preceding bursts and by (2) capture neutrons which are generated in the borehole environment by the slowing fast neutrons. Such components also represent the predominate background component in the otherwise predominant inelastic scattering gamma radiation detected during the inelastic gate.

Since in furtherance of the invention, it is desirable to obtain as pure an inelastic scattering gamma ray spectrum as possible, the presence of such capture components in the inelastic spectrum must be compensated for. This is done according to principles of the invention, by subtracting the energy spectrum derived from the background gate measurements from the inelastic scattering gamma ray spectrum derived from the inelastic gate measurements. By use of a concurrently generated background standard detected in a time interval following the neutron burst interval of interest, as opposed to the aforementioned prior art compensation techniques of subtracting background counts detected prior to the neutron burst of interest from the inelastic scattering gamma ray counts or of using a laboratory or test pit background standard, the inelastic spectrum is more accurately and correctly compensated for background.

Referring now again to FIG. 1, the inelastic scattering gamma ray spectrum and the background gamma ray spectrum are generated by data acquisition buffers 56 and 58, respectively, which, under the control of the master programmer 42, accumulate the appropriate counts-per-channel signals from the signal processing and cable interface circuits 40. Specifically, the inelastic spectrum acquisition buffer 56 accumulates the inelastic scattering gamma ray counts-per-channel signals for a period long enough to give a statistically satisfactory spectrum and is then instructed by the master programmer 42 to output the spectrum, recycle to zero, and accumulate a new spectrum for a like period. Similarly, the background spectrum acquisition buffer 58 accumulates the background gamma counts-per-channel data for a specified period corresponding to that employed in the acquisition of the inelastic spectrum. Where a capture spectrum is to be used in the analysis procedure for the formation under investigation, additional acquisition buffers may be provided as needed. At the end of the counting period, the acquisition buffer 58 is read out and recycled to accumulate a new background spectrum. It will be appreciated, therefore, that the background spectrum is repetitively updated as the sonde 10 is moved through the well bore, and thus automatically takes into account variations in such factors as sonde environment, sonde performance source strength and the like which affect the shape of the inelastic spectrum. It will also be understood that, for purposes of permitting the separate accumulation of the inelastic spectrum and the background spectrum, the control signals from PHA 36 to the buffer memory 37 will include digital address information, e.g., flag bits, which designate the particular gating period during which each analyzed gamma ray was detected.

Following accumulation in the acquisition buffers 56 and 58, the inelastic scattering spectrum and the capture spectrum are transferred to storage buffers (not shown) in a constituent analysis computer 60. The computer 60 may comprise a general purpose digital computer, such as the PDP-11 computer manufactured by the Digital Equipment Corporation, Maynard, Mass., or, alternatively, it may comprise an analog computer. In either event, it will be understood that the computer 60 is suitable programmed or constructed to perform the spectrum matching and constituent proportions determining functions described in Moran et al. U.S. Pat. No. 3,521,064, the pertinent portions of which are hereby incorporated by reference. In addition, the computer 60 is capable of carrying out certain spectrum processing and pre-analysis steps, as described hereinafter, preparatory to the analysis of the inelastic scattering spectrum.

Within the computer 60, the signals representing the inelastic scattering and background spectra are respectively applied to a combiner circuit 62 where the information contained in the background spectrum acquisition buffer 58 is removed from the information contained in the inelastic spectrum acquisition buffer 56, for example, by means of direct channel by channel subtraction. It will be appreciated that prior to the subtraction process appropriate scaling and correction for the gain and offset of the background gate information relative to the burst gate information are effected. The resultant output of combiner circuit 62 is therefore representative of a new inelastic spectrum which has been corrected for background effects.

Within the computer 60, the signals representing the net inelastic scattering spectrum are then applied to the spectrum comparison circuits 70 for comparison with the standard spectra in the manner of the Moran et al. U.S. Pat. No. 3,521,064. a store 68 is set to contain signals for each of the inelastic standards making up the composite spectrum with which the inelastic scattering gamma ray spectra are generated is described in the referenced portions of Moran et al. U.S. Pat. No. 3,521,064. As there described, a standard spectrum is included for each constituent postulated to be present in the formation and contributing to the detected inelastic scattering gamma ray spectrum. The inelastic standard spectra provided in store 68 might include, for example, spectra for oxygen, carbon, calcium and silicon. In addition, the inelastic standard spectra may include an observed capture spectrum in the manner described in the above referenced Hertzog, et al. application. The signals representing the unknown net inelastic scattering gamma ray spectrum, as outputed by combiner circuit 62, are compared with signals representing a linear combination of signals representing the weighted standard inelastic spectra to determine the weights of proportions ($w_i$) of the constituents which provide the combination, i.e., the composite spectrum, which most nearly matches the unkown inelastic scattering spectrum. This comparison is made in the spectrum comparison circuits 70 of FIG. 1. Preferably, the "least squares" criterion is used to determine when a best fit has been obtained between the composite spectrum and the unknown spectrum. After the determination of the weights ($w_i$), comparison circuits 70 transmit signals representative thereof to a recorder 72. The recorder 72 includes the conventional visual and magnetic tape components for making the customary record of logging signals as a function of depth. The usual cable-following mechanical linkage 74 for driving the recorder 72 in synchronism with the cable 14 is provided for this purpose. Advantageously, suitable ratios of such constituent weights, e.g. the carbon/oxygen ratio and the calcium/silicon ratio in addition to the output of combiner circuit 62, may be formed and recorded as a function of tool depth.

Although the computer 60 is depicted in FIG. 1 as located at the well site, it may if desired by located remotely and operated on recorded representations of the counts-per-channel data transmitted over the cable 14. To that end, the output signals from the signal processing and cable interface circuits 40 may be recorded directly on tape in the manner indicated in FIG. 1.

We claim

1. A method for determining the characteristics of earth formations surrounding a well borehole comprising the steps of:

repetitively irradiating the earth formations surrounding the well bore with relatively short duration pulses of high energy neutrons;

detecting during each such pulse of high energy neutrons, gamma radiation due to the inelastic scattering of neutrons by materials comprising the earth formations surrounding the borehole and providing information representative thereof;

detecting immediately following each such pulse of high energy neutrons, background gamma radiation due to thermal neutron capture and providing information representative thereof; and correcting said inelastic gamma representative information to compensate for said background representative information.

2. The method of claim 1 wherein the step of correcting said inelastic gamma ray representative information is performed by subtracting said background representative information from said representative information detected during said neutron pulses.

3. The method of claim 1 wherein the steps are performed repetitively while moving a well tool through the borehole and the compensated inelastic gamma ray representative information are logged as a function of borehole depth of said tool.

4. The method of claim 1 wherein the step of detecting, immediately following each high energy neutron pulse, the background gamma radiation, is performed by detecting gamma radiation occurring during a relatively short duration interval, said background gamma radiation detecting interval being of comparable duration with said inelastic gamma ray detection interval duration.

5. The method of claim 4 wherein said relatively short duration detection interval comprises approximately an eighteen microsecond duration interval.

6. The method of claim 1 wherein said representative information comprises counts related to the detection gamma rays.

7. Apparatus for determining the characteristics of earth formations surrounding a well borehole comprising:

means for repetitively irradiating the earth formations surrounding the well bore with relatively short duration pulses of high energy neutrons;

means for detecting during each such pulse of high energy neutrons, gamma radiation due to the inelastic scattering of neutrons by materials comprising the earth formations surrounding the borehole and for storing gamma ray counts representative thereof;

means for detecting immediately following each such pulse of high energy neutrons, background gamma radiation due to thermal neutron capture and for storing counts representative thereof; and means for correcting said inelastic gamma ray counts to compensate for said background counts.

8. The apparatus of claim 7 wherein said correcting means includes means for subtracting said background counts from said counts occurring during said neutron pulses.

9. The apparatus of claim 7 further comprising:

means for moving said apparatus through the borehole; and means for logging the compensated inelastic gamma ray counts as a function of borehole depth of said apparatus.

10. The apparatus of claim 7 wherein the respective detection intervals of said background detecting means and said inelastic gamma ray detecting means are comparable in duration.

11. The apparatus of claim 10 wherein the duration of the respective detection intervals is approximately eighteen microseconds.

12. The apparatus of claim 7 wherein said irradiating means is operated at a repetition rate of about 4,000 pulses per second or greater.

13. A method for investigating the composition of an earth formation traversed by a well bore, comprising the steps of:

(a) repetitively irradiating the formation with time spaced bursts of fast neutrons;

(b) detecting gamma rays during first time periods related to the occurrence of the neutron bursts such that the detected gamma rays result predominately from inelastic scattering interactions between the incident neutrons and constituents of the formation;

(c) detecting background gamma rays during second time periods following the occurrence of neutron bursts during which the detected gamma rays result predominately from interactions between incident neutrons and constituents of the formation other than inelastic scattering interactions;

(d) generating an energy spectrum of the predominately inelastic scattering gamma rays detected in step (b);

(e) generating an energy spectrum of the background gamma rays detected in step (c); and (f) subtracting from said inelastic scattering gamma ray spectrum.

14. A method of investigating the composition of an earth formation, comprising the steps of:

(a) providing an energy spectrum of gamma rays detected during first time periods related to a succession of time-spaced bursts of fast neutrons such that the detected gamma ray result predominately from inelastic scattering interactions between the incident neutrons and constituents of the formation;

(b) providing an energy spectrum of background gamma rays detected during second time periods which closely follow said neutron bursts during which the detected gamma rays result predominately from interactions between the incident neutrons and constituents of the formation other than inelastic scattering interactions; and (c) subtracting the background gamma ray spectrum from said inelastic scattering gamma ray spectrum.

15. Apparatus for investigating the composition of an earth formation traversed by a well bore, comprising:

(a) means for repetitively irradiating the formation with time-spaced bursts of fast neutrons;

(b) means for detecting gamma rays resulting from interactions between the incident neutrons and constituents of the formation and for generating signals representative of the energies of the detected gamma rays;

(c) means responsive to the signals from the detector means for segregating them into a plurality of channels according to the energies of the corresponding gamma rays, thereby to generate an energy spectrum of said corresponding rays;

(d) means for controlling the operation of the spectrum generating means so as (1) to generate a first energy spectrum of gamma rays detected during first time periods related to the occurrence of the neutron bursts such that the gamma rays detected therein result predominately from inelastic scattering neutron interactions and (2) to generate a second energy spectrum of background gamma rays detected during second time periods which closely follow said first time periods during which the detected gamma rays result predominately from neutron interactions other than inelastic scattering interactions; and (e) means for utilizing signals representing said second energy spectrum to moddify signals representing said first energy spectrum.

* * * * *

UNITED STATES PATENT AND TRADEMARK OFFICE
CERTIFICATE OF CORRECTION

PATENT NO. : 4,232,220
DATED : November 11, 1980
INVENTOR(S) : Russel C. Hertzog It is certified that error appears in the above—identified patent and that said Letters Patent is hereby corrected as shown below:

In the claims, Column 8, line 40 (Claim 13) "subtracting from" should read -- subtracting said background gamma ray spectrum from -- ;

Column 10, line 9 (Claim 15), "moddify" should read -- modify -- .

Signed and Sealed this

Tenth Day of May 1983

[SEAL]

Attest:

GERALD J. MOSSINGHOFF

Attesting Officer

Commissioner of Patents and Trademarks